United States Patent
McIntosh

(10) Patent No.: US 7,628,325 B2
(45) Date of Patent: Dec. 8, 2009

(54) SYSTEMS, METHODS AND COMPUTER PROGRAM PRODUCTS FOR WIRELESSLY PREPROCESSING A TRANSACTION WHILE IN A QUEUE FOR A POINT-OF-TRANSACTION

(75) Inventor: Robert McIntosh, Loganville, GA (US)

(73) Assignee: AT&T Intellectual Property I, LP, Reno, WV (US)

( * ) Notice: Subject to any disclaimer, the term of this patent is extended or adjusted under 35 U.S.C. 154(b) by 270 days.

(21) Appl. No.: 11/268,790

(22) Filed: Nov. 8, 2005

(65) Prior Publication Data

US 2007/0102508 A1    May 10, 2007

(51) Int. Cl.
*G06F 19/00* (2006.01)

(52) U.S. Cl. ........................ 235/385; 235/379; 235/383; 705/16

(58) Field of Classification Search ................. 235/385, 235/379, 472.01, 492, 380, 383, 493; 705/43, 705/16
See application file for complete search history.

(56) References Cited

U.S. PATENT DOCUMENTS

| | | | |
|---|---|---|---|
| 6,985,753 B2 * | 1/2006 | Rodriguez et al. | ........ 455/550.1 |
| 7,207,477 B1 * | 4/2007 | Ramachandran | ............ 235/379 |
| 2001/0007815 A1 * | 7/2001 | Philipsson | .................... 455/41 |
| 2004/0153377 A1 * | 8/2004 | Dallman | ....................... 705/27 |
| 2006/0100961 A1 * | 5/2006 | Paterno et al. | ................. 705/43 |

* cited by examiner

*Primary Examiner*—Seung H Lee
(74) *Attorney, Agent, or Firm*—Myers Bigel Sibley & Sajovec

(57) ABSTRACT

A transaction is preprocessed wirelessly in response to a wireless transaction preprocessing user device being in a queue for a point-of-transaction. The transaction that was preprocessed is then completed in response to the wireless transaction preprocessing user device reaching the point-of-transaction. Financial transactions and/or purchase of goods and/or services may thereby be preprocessed wirelessly and then completed at a point-of-transaction. Related devices and computer program products are also disclosed.

19 Claims, 4 Drawing Sheets

SYSTEMS, METHODS AND COMPUTER PROGRAM PRODUCTS FOR WIRELESSLY PREPROCESSING A TRANSACTION WHILE IN A QUEUE FOR A POINT-OF-TRANSACTION

FIELD OF THE INVENTION

This invention relates to data processing systems, methods and computer program products, and more particularly to transaction processing systems, methods and computer program products.

BACKGROUND OF THE INVENTION

Electronic systems, methods and/or computer program products are widely used to assist consumers in completing a transaction at a point-of-transaction. Often, the consumers are lined up in a queue, on foot or in a vehicle, at the point-of-transaction. For example, banking transactions may be facilitated using an automatic teller machine (ATM). Vehicles typically line up in a vehicle queue for the ATM, wherein the first vehicle in the queue accesses the ATM and the remaining vehicles wait their turn. Similarly, in providing goods and/or services, such as food, coffee or dry cleaning services, individuals on foot or in vehicles may line up in a queue for a drive-up or service window. In many restaurant operations, a menu board may be provided along with an intercom, so that selections may be made while waiting in a queue, and then delivered at a drive-up window at the front of the queue.

SUMMARY OF THE INVENTION

Transactions may be performed, according to some embodiments of the present invention, by preprocessing the transaction wirelessly, in response to a wireless transaction preprocessing user device being in a queue for a point-of-transaction. In other embodiments, the transaction that is preprocessed is then completed in response to the wireless transaction preprocessing user device that is in the queue reaching the point-of-transaction.

In some embodiments, preprocessing is performed in response to the wireless transaction preprocessing user device being second or more in the queue for the point-of-transaction, and completing the transaction is performed at the point-of-transaction in response to the wireless transaction preprocessing user device being first in the queue for the point-of-transaction. Preprocessing may be performed in response to sensing that the wireless transaction preprocessing user device is in the queue for the point-of-transaction. Moreover, in other embodiments, advertising related to the point-of-transaction is transmitted to the wireless transaction preprocessing user device that is in the queue for the point-of-transaction.

In some embodiments, the transaction is a financial transaction and the preprocessing may include transmitting and/or accepting information regarding the financial transaction wirelessly from a wireless transaction preprocessing user device that is in a queue for the point-of-transaction. Completing the transaction may include accepting additional information and completing the financial transaction at the point-of-transaction. In particular embodiments of a financial transaction, the transaction is an automatic teller machine (ATM) transaction, and the preprocessing may include transmitting and/or accepting indications of a type of ATM transaction and a monetary amount of the ATM transaction wirelessly from a wireless transaction preprocessing user device in a vehicle that is in a vehicle queue for the ATM. Completing the transaction may include accepting a personal identification number and dispensing/accepting funds at the ATM. Analogous embodiments may be provided for walk-up ATMs.

In other embodiments, the transaction is a purchase of goods and/or services at the point-of-transaction, and preprocessing may be performed by transmitting and/or accepting information regarding the transaction wirelessly from a wireless transaction preprocessing user device that is in a queue for the point-of-transaction. Completing the transaction may be performed by completion of a payment for the goods and/or services and providing the goods and/or services at the point-of-transaction. In particular embodiments of the invention, the transaction is a purchase of goods and/or services at a drive-up window, and preprocessing is performed by transmitting and/or accepting identification of the goods and/or services wirelessly from a wireless transaction preprocessing user device in a vehicle that is in a vehicle queue for the drive-up window. The transaction may then be completed by accepting payment for the goods and/or services and providing the goods and/or services at the drive-up window. Analogous embodiments may be provided for walk-up windows.

In some embodiments of the present invention, the wireless transaction preprocessing user device is a dedicated device that can provide an identification of a user thereof. For example, a vehicle windshield mounted device may be used. In other embodiments, the wireless transaction preprocessing user device is integrated into a multiple purpose wireless user device, such as a vehicle audio/video/navigation system. Preprocessing may be performed wirelessly using a short-range ad-hoc wireless network.

Point-of-transaction systems may be provided, according to some embodiments of the present invention, by a wireless system that is configured to preprocess a transaction wirelessly in response to a wireless transaction preprocessing user device being in a queue for the point-of-transaction. The point-of-transaction system may also include a transaction completing system that is configured to complete the transaction that was preprocessed, at the point-of-transaction. Point-of-transaction systems for financial/ATM transactions and/or for the purchase of goods and/or services may be provided, as was described above.

Wireless user devices also may be provided according to other embodiments of the present invention. In some embodiments, a wireless user device includes a wireless system that is configured to preprocess a transaction wirelessly in response to the wireless user device being in a queue for a point-of-transaction. Wireless user devices for ATMs and/or purchasing of goods and/or services may be provided as was described above.

It will be understood by those having skill in the art that embodiments of the present invention may be provided by methods that are performed by a point-of-transaction system and/or by a wireless user device, by the point-of-transaction system itself, by the user device itself and/or by computer program products for the point-of-transaction system and/or for the user device.

DETAILED DESCRIPTION

Figure 1:
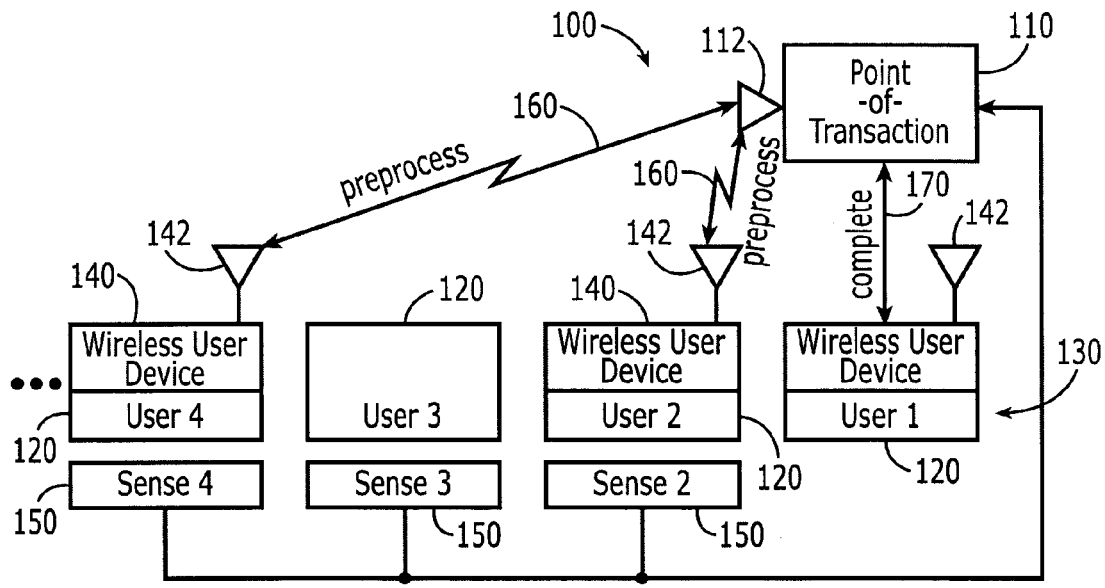
FIG. 1 is a block diagram of systems, methods and/or computer program products for performing a transaction according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items and may be abbreviated as "/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block may be separated into multiple blocks and/or the functionality of two or more blocks may be at least partially integrated.

As used herein, the root term "wireless" means that airborne radio frequency electromagnetic signals provide at least part of a transmission path between a signal transmitter, such as a user device, and a signal receiver, such as a point-of-transaction device.

FIG. 1 is a block diagram of systems, methods and/or computer program products for performing a transaction according to some embodiments of the present invention. As shown in FIG. 1, these systems, methods and/or computer program products 100 include a point-of-transaction 110 and a plurality of users 120 in a queue 130 for the point-of-transaction 110, wherein a first user, user 1, is first in the queue 130, a second user, user 2, is second in the queue 130, etc. Fewer or more than four users 120 may be present in the queue 130.

As also shown in FIG. 1, according to some embodiments of the present invention, the transaction is preprocessed wirelessly in response to a wireless transaction preprocessing user device 140 being in the queue 130 for the point-of-transaction 110. Preprocessing may be performed using a wireless link 160 between a first antenna 142 associated with the wireless transaction preprocessing user device 140 and a second antenna 112 associated with the point-of-transaction system 110. It will be understood by those having skill in the art that the antennas 112 and 142 need not be directly connected to the point-of-transaction 110 and the wireless user device 140, respectively, but can be connected remotely using a wired and/or wireless connection. It will also be understood that not every user 120 in the queue 130 may include a wireless transaction preprocessing user device 140, as shown by user 3. Moreover, the wireless link 160 that is used to preprocess the transaction wirelessly may be a short-range ad-hoc wireless link, such as a WiFi, Bluetooth, RFID and/or other short-range wireless link known to those having skill in the art. Alternatively, a wide area wireless link such as a cellular- and/or satellite-based wireless link 160 may be used.

Still referring to FIG. 1, the transaction that was preprocessed is completed in response to the wireless transaction preprocessing user device 140 that is in the queue 130 reaching the point-of-transaction 110, as shown by arrow 170. Completion of the transaction may involve manual entry of information at a keyboard, verbal communication between an attendant and a user, providing of goods and/or services from a point-of-transaction attendant to a user, transfer of funds and/or other conventional operations for completing a transaction.

Still referring to FIG. 1, preprocessing of the transaction may be preceded by sensing that the wireless transaction preprocessing user device 140 is in the queue 130 for the point-of-transaction 110. In some embodiments, discrete sensors 150 may be provided, for example using photoelectric cells, loop sensors, image sensors, infrared sensors and/or other forms of sensor technology that can sense that a wireless user device 140, a user 120 of the wireless user device 140 and/or a vehicle of a user 120 of the wireless user device is in the queue 130. However, in other embodiments, sensing may be incorporated into the wireless link 160 that is provided for preprocessing. For example, as is well known to those having skill in the art, ad-hoc wireless links may only be set up when a user is within a proximity of another ad-hoc wireless node. In still other embodiments, the wireless user devices 140 may include a Global Positioning System (GPS) and/or other location system that conveys a location of the wireless user device 140 to the point-of-transaction 110.

Figure 2:
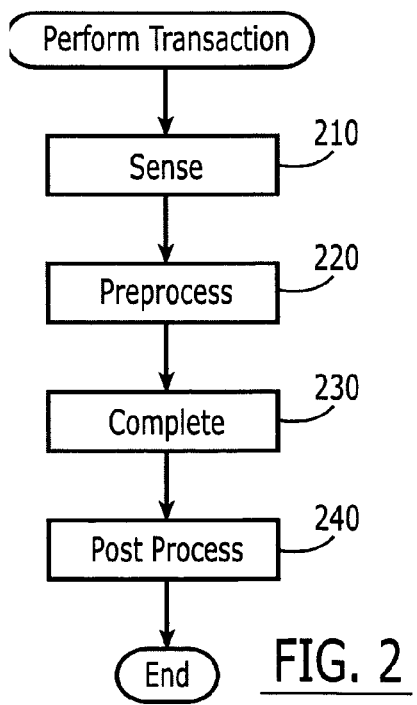
FIG. 2 is a flowchart of operations to perform a transaction according to some embodiments of the present invention.

FIG. 2 is a flowchart of operations that may be performed to perform a transaction according to some embodiments of the present invention. These operations may be performed by a transaction performing system, method and/or computer program product 100 of FIG. 1. As shown at Block 210, sensing is first optionally performed to sense that a wireless transaction preprocessing user device, such as a wireless transaction preprocessing user device 140 of FIG. 1, is in a queue, such as the queue 130 of FIG. 1, for a point-of-transaction, such as the point-of-transaction 110 of FIG. 1. As was described above, sensing may be performed by providing sensing system 150 that can include optical, electromagnetic, infrared and/or other conventional sensing devices, by a locating system such as GPS, and/or may be included within the setting up of a wireless preprocessing link by, for example, an ad-hoc short-range wireless network.

Still referring to FIG. 2, at Block 220, the transaction is preprocessed wirelessly in response to a wireless transaction preprocessing user device, for example a wireless preprocessing user device 140 of FIG. 1, being in a queue, such as the queue 130 of FIG. 1 for the point-of-transaction, such as the point-of-transaction 110 of FIG. 1. Preprocessing may be performed by setting up a wireless link 160 between a first antenna 142 associated with the wireless transaction preprocessing user device 140 and a second antenna 112 between a point-of-transaction system 110. Specific examples of preprocessing will be described below in connection with Automatic Teller Machine (ATM) transactions and drive-up window transactions.

Still referring to FIG. 2, at Block 230, the transaction that was preprocessed is completed at the point-of-transaction, for example at the point-of-transaction 110 of FIG. 1. Completion of the transaction may be provided by obtaining a user identification/authentication, by obtaining payment, by providing goods and/or services, and/or other conventional point-of-transaction activities. Finally, at Block 240, post-processing operations also optionally may be performed. Post-processing operations may include billing a transaction to a user's credit card, sending a receipt and/or statement to a user by mail and/or email, sending a reminder to the user, and/or other conventional post-processing operations for a transaction.

Some embodiments of the present invention may arise from recognition that valuable time may be wasted by users and/or by a point-of-transaction system, while the users are merely waiting in a queue. Accordingly, some embodiments of the invention can preprocess a transaction wirelessly in response to a wireless transaction preprocessing user device being in a queue for a point-of-transaction. The completion of a transaction at the point-of-transaction may thereby occur more quickly, which can reduce user queue time, increase point-of-transaction throughput, increase user security by reducing the time that the user is exposed at a point of transaction, reduce health issues by minimizing interactions at the point-of-transaction, and/or reduce paper costs at the point-of-transaction by enabling paperless completion of the transaction and/or post processing operations.

ATM transactions according to exemplary embodiments of the present invention now will be described in connection with FIGS. 1 and 2. In some ATM embodiments, sensing of Block 210 may be performed by sensing that a vehicle is in a vehicle queue, or an individual is in a queue of individuals for a walk-up ATM. Preprocessing of Block 220 may then be performed by wirelessly transmitting from the wireless user device 140 and/or wirelessly receiving at the point-of-transaction 110, indications of a type of ATM transaction (such as a deposit or a withdrawal), and a monetary amount of the ATM transaction, from a wireless transaction preprocessing user device 140 in a queue 130 for the ATM. The transaction is completed at Block 230 by providing a Personal Identification Number (PIN) and dispensing and/or accepting funds at the ATM.

In some ATM embodiments, the PIN is not provided over the wireless link 160 for security purposes, and/or to allow the user to exit the queue 130 before reaching the ATM. Thus, the PIN is provided at the ATM, to verify the user's identity, and to confirm that the user wishes to complete the transaction. Funds are dispensed/accepted and/or a receipt may be provided at the ATM conventionally. The user's time at the ATM may be reduced, and in some embodiments minimized, by allowing a portion of the ATM transaction to be preprocessed. In other ATM embodiments, the PIN is provided as part of preprocessing, so that funds may need only be taken/dispensed at the ATM. Finally, at Block 240, post-processing may be performed by debiting or crediting the user's account, sending a receipt via mail and/or email, and/or other conventional post-processing operations.

The above-described ATM transactions may be generalized to other financial transactions, wherein during preprocessing, information regarding the financial transaction is transmitted and/or accepted wirelessly from a wireless transaction preprocessing user device that is in a queue for the point-of-transaction. The transaction may be completed by accepting additional information and completing the financial transaction at the point-of-transaction.

The performing of a transaction for the purchase of goods and/or services at a drive-up window, according to other embodiments of the present invention, will now be described in connection with FIGS. 1 and 2. The goods that are sold may include food, beverages and/or other goods, and the services that are purchased may include dry-cleaning, media rental and/or other services. Walk-up transactions also may be provided.

In the purchase of goods and/or services, sensing may optionally be performed at Block 210 similar to that which was described in the ATM transaction. Preprocessing of Block 220 may include transmitting and/or accepting identification of the goods and/or services and/or of the user wirelessly from the wireless transaction preprocessing user device 140 that is maintained by the user or is in a vehicle that is in a queue 130 for the drive-up window. The identification of the goods and/or services may be performed by indicating food/beverage items to be ordered, by indicating the dry-cleaning customer name and/or goods to be picked up. A bar code reader may also be included in the user device in some embodiments, to read a bar code on a claim check. In some embodiments, payment is not effected wirelessly as part of preprocessing, for security purposes and/or because the user may elect to leave the queue 130 before completing the transaction. In other embodiments, however, payment may be effected as part of preprocessing. At Block 230, the transaction is completed by accepting payment for the goods and/or services and/or providing the goods and/or services at the window. Post-processing 240 may be performed to send the user a receipt, statement or other confirmation, as is conventionally done.

The purchase of goods and/or services as described above may be generalized to the purchase or service of goods at any point-of-transaction, wherein preprocessing includes transmitting and/or accepting information regarding the transaction wirelessly from a wireless transaction preprocessing user device that is in a queue for the point-of-transaction. The transaction may be completed by completing a payment for the goods and/or services and providing the goods and/or services at the point-of-transaction.

Preprocessing according to any of the above-described embodiments of the invention may also include advertising. Thus, for example, while the user 120 is in the queue 130, the user 120 may be provided with advertising material over the wireless link 160. The advertising may relate to the point-of-transaction 110. In particular, in an ATM transaction, the user 120 may be informed of related services that are offered by the bank, such as mortgages or loans, while the user is in the queue 130 prior to, concurrent with and/or after the ATM transaction preprocessing. In still other embodiments, advertising and/or other content that is unrelated to the ATM transaction or the bank may be provided to the user 120 using the wireless link 160 while the user 120 is in the queue 130. This advertising and/or other content may be tailored to the user 120 and/or the user's demographics, based on knowledge of the user's identity that is provided by the wireless transaction preprocessing user device 140.

Similarly, in the purchase of goods and/or services at a drive-up/walk-up window, advertisements for the goods or services, such as specials on food, beverages and/or dry-cleaning, may be provided to the user 120 while in the queue 130. The specials may be tailored to the user's selection during preprocessing and/or knowledge of the user's identity and/or demographics that may be provided by the wireless user device 140. The advertising may be provided prior to, during and/or after the user's identifying the goods or services wirelessly. Moreover, in still other embodiments, advertising and/or other content that is related to and/or unrelated to the goods or services may also be provided, which, in some embodiments, may be tailored to the user or the user's demographics.

Moreover, coupons may be provided according to various embodiments of the present invention. A coupon may be a printed coupon and/or can be an electronic coupon that is displayed on the wireless transaction preprocessing device and/or on another device. In some embodiments, the coupon may accompany the displaying and/or printing of a receipt. However, in other embodiments, the printing and/or displaying of a coupon may be independent of a receipt. In some embodiments, the coupons can relate to the goods and/or services being purchased, related goods and/or services, and/or unrelated goods and/or services that are offered by the seller of the goods and/or services that are being purchased. Moreover, in other embodiments, the coupons may be unrelated to the goods and/or services being purchased and/or unrelated to the seller of the goods and/or services.

Figure 3:
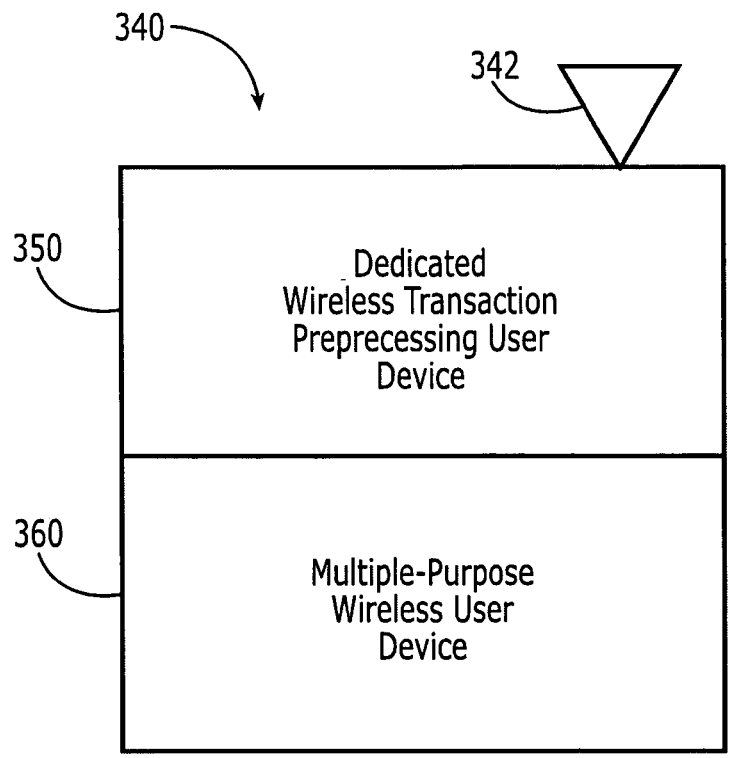
FIG. 3 is a block diagram of a wireless transaction preprocessing user device according to some embodiments of the present invention.

FIG. 3 is a block diagram of wireless user devices according to some embodiments of the present invention. These wireless user devices 340 may correspond to wireless transaction user preprocessing devices 140 of FIG. 1, and may include an antenna 342 which may correspond to antenna 142 of FIG. 1.

In some embodiments, the wireless user device 340 is a dedicated wireless transaction preprocessing user device 350 that provides an identification of a user thereof and can provide additional preprocessing options for a user. For example, a dedicated wireless transaction preprocessing user device 350 may operate similar to a windshield-mounted automated toll-paying device, often referred to as an "e-pass" device, that can be used to automatically pay tolls on a toll road as a user's vehicle passes by a toll collection area using a short-range wireless signal that allows the dedicated device to identify itself to a toll collection system.

In other embodiments, however, the wireless user device 340 may be integrated into a multiple-purpose wireless user device 360. For example, wireless transaction preprocessing may be integrated into a conventional wireless terminal, such as a cellular and/or satellite radiotelephone with or without a multi-line display, a Personal Communications System (PCS) terminal that may combine a radiotelephone with data processing, facsimile and/or data communications capabilities, a Personal Digital Assistant (PDA) that can include a radio frequency transceiver and a pager, Internet/intranet access, Web browser, organizer, calendar and/or a GPS receiver, and/or conventional laptop and/or palmtop computers or other appliances, which include a radio frequency transceiver, for wireless voice and/or data communications. In other embodiments, the multiple purpose wireless user device 360 may include a dashboard display that is provided in a vehicle as part of an audio/video/navigation system for the vehicle. These systems can obtain GPS information for navigation purposes and can transmit information that is provided from a user input device in the vehicle to an external network using a short-range wireless, cellular, satellite and/or other wireless connection. The user input device can include an interactive voice response system, a keypad, a touch screen and/or other conventional user input devices. Moreover, in any of the embodiments described above, a user device may include a fingerprint or other biometric device for authentication. Encryption also may be used to enhance security.

Figure 4:
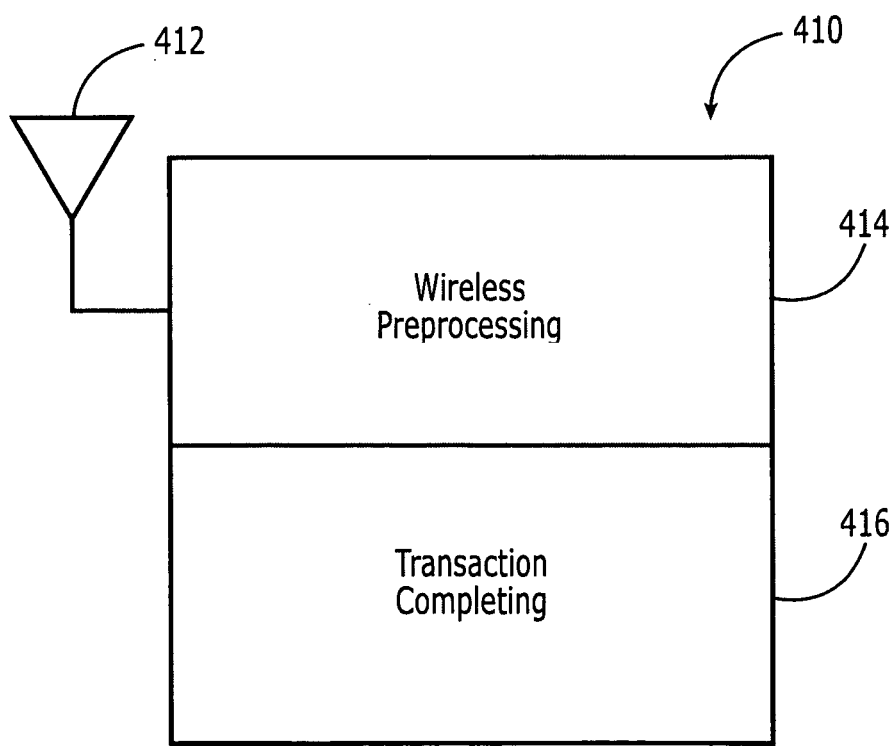
FIG. 4 is a block diagram of a point-of-transaction device according to some embodiments of the present invention.

FIG. 4 is a block diagram of point-of-transaction systems according to some embodiments of the present invention, which may correspond to the point-of-transaction system 110 of FIG. 1. These point-of-transaction systems 410 may include a wireless antenna 412, which may correspond to the antenna 112 of FIG. 1. As shown in FIG. 4, these point-of-transaction systems 410 may include a wireless system 414 that is configured to preprocess a transaction wirelessly in response to a wireless transaction preprocessing user device, such as a user device 140 of FIG. 1 or a user device 340 of FIG. 3, being in a queue for the point-of-transaction. A transaction-completing system 416 also is provided that is configured to complete the transaction that was preprocessed, at the point-of-transaction.

Figure 5:
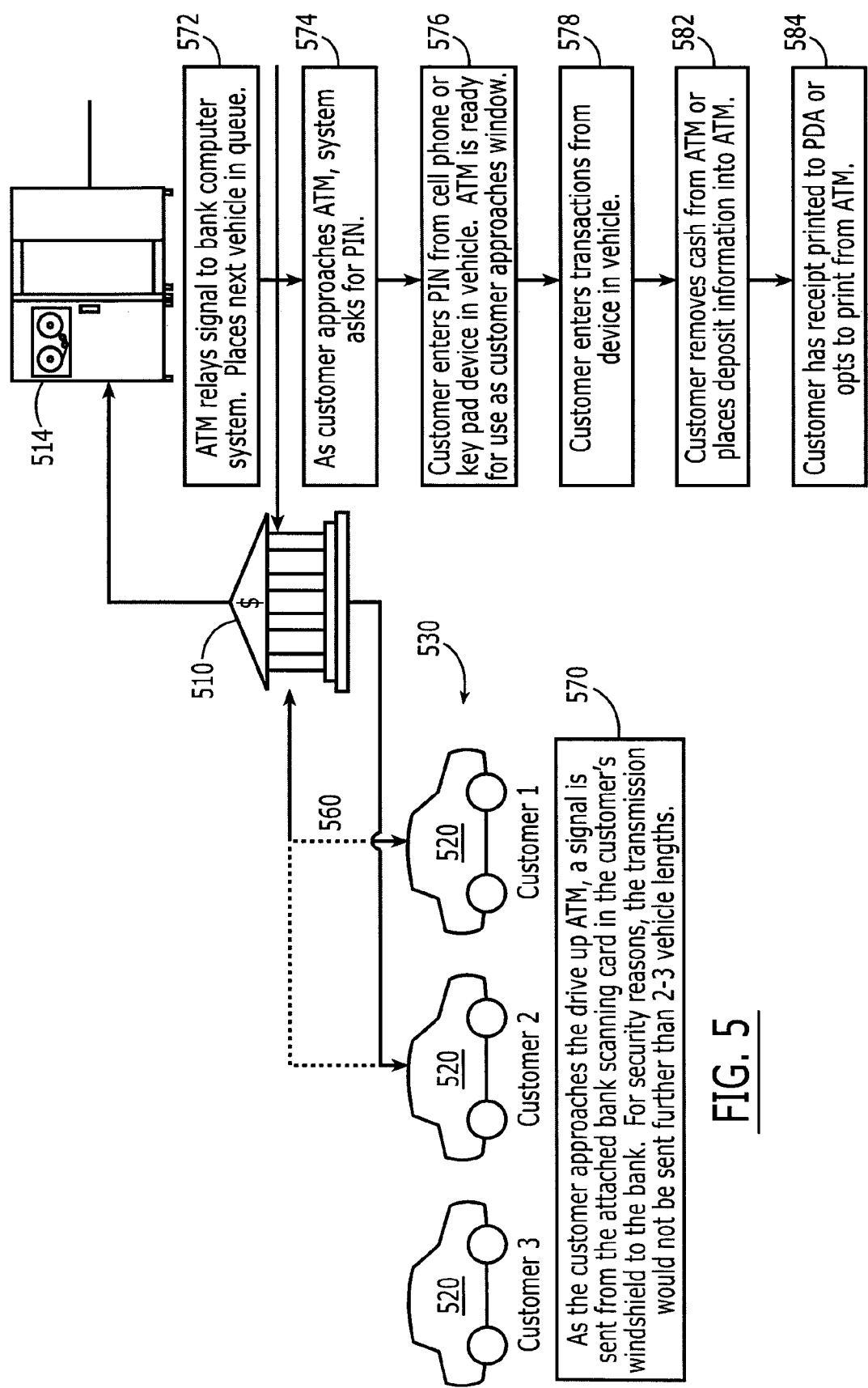
FIG. 5 is a conceptual flow diagram of systems, methods and computer program products for performing ATM transactions according to some embodiments of the present invention.

FIG. 5 conceptually illustrates ATM transaction preprocessing and completion according to other embodiments of the present invention. As shown in FIG. 5, a point-of-transaction is embodied as a bank 510 that communicates with a plurality of vehicles 520 belonging to a plurality of customers in a queue 530, using bidirectional wireless links 560. Discrete wireless transaction preprocessing user devices that may be attached, for example, to the vehicle windshield, similar to toll collecting devices described above, may be used in some embodiments.

Continuing with the description of FIG. 5, as shown at Block 570, as the customer approaches a drive-up ATM, a signal is sent from an attached bank scanning card in the customer's vehicle's windshield to the bank 510. In some embodiments, for security reasons, the transmission may not be sent further than two or three vehicle lengths. As shown at Block 572, the ATM relays a signal to the bank computer system 514, and places the next vehicle 520 in the queue.

At Block 574, as the vehicle approaches the ATM, the system asks for a PIN. At Block 576, the customer enters the PIN from the customer's cell phone and/or keypad device in the car. Alternatively, the ATM keypad may be used. The ATM is then ready for use as the customer approaches the ATM window. As shown at Block 578, the customer may enter transactions from a user device in the vehicle, and at Block 582, the customer removes cash from the ATM and/or deposits cash/checks into the ATM. Finally, at Block 584, a customer receipt may be printed to the customer's PDA or can be printed by the ATM.

Accordingly, in embodiments of FIG. 5, preprocessing of the transaction may be performed using multiple user devices, such as a windshield-mounted device and a cell phone. Moreover, preprocessing may include a relatively small or a relatively large portion of the entire transaction and may include identification and/or authentication information. Post-processing can also use the preprocessing wireless user device and/or other devices. The point-of-transaction system may track users as they move through the queue to the point-of-transaction, to ensure that the proper transaction is associated with the proper user. Embodiments of FIG. 5 can thereby reduce customer queue time, increase security by reducing or minimizing time exposed to the elements, reduce health issues by allowing a customer to use the customer's own keypad for at least some of the transaction, reduce paper costs to the bank by allowing a customer's PDA to receive a receipt, and/or can be established for multiple ATMs.

Figure 6:
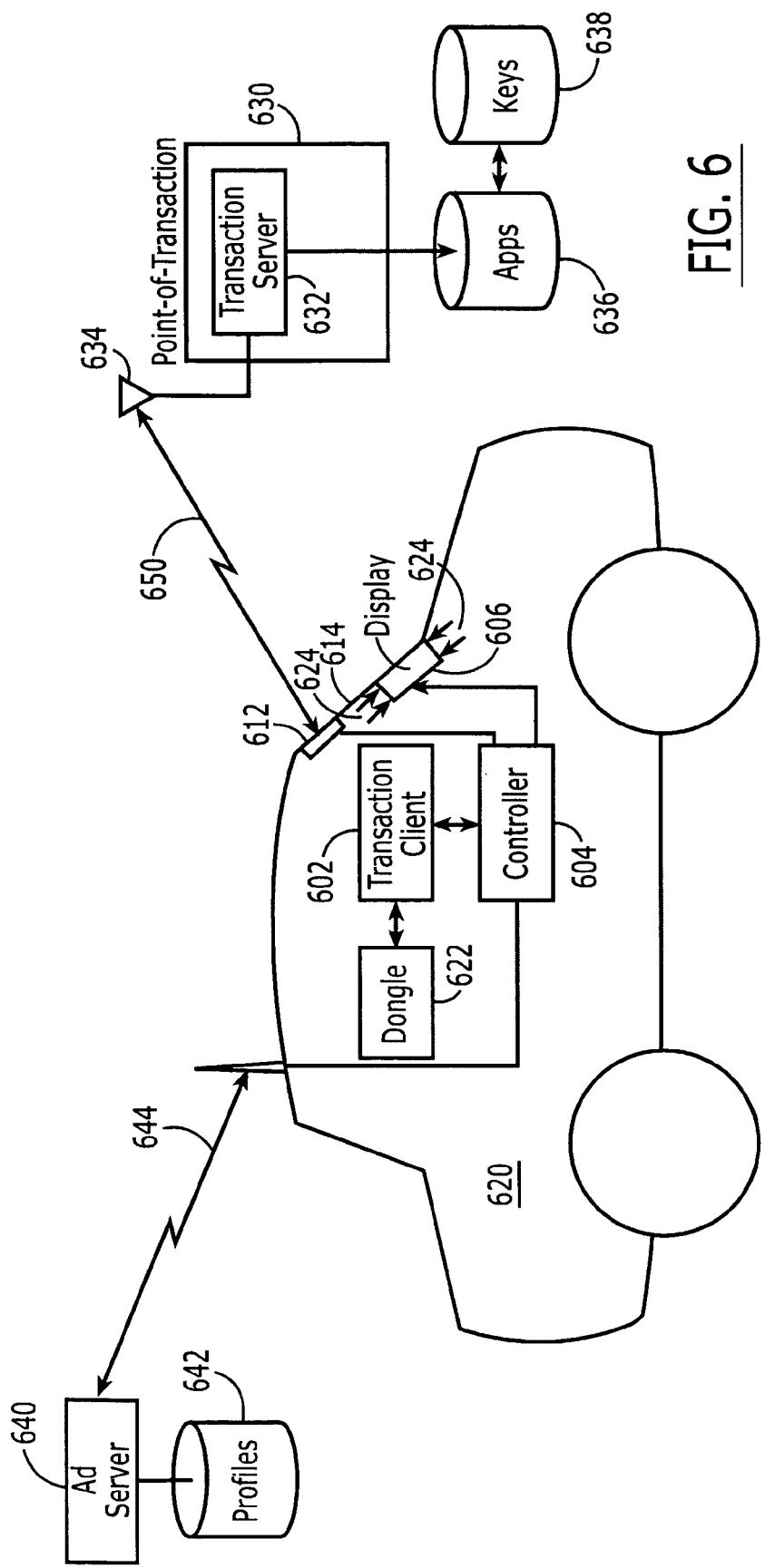
FIG. 6 is a block diagram of systems, methods and computer program products for preprocessing a transaction in a vehicle according to some embodiments of the present invention.

FIG. 6 is a conceptual block diagram of other embodiments of the present invention, illustrating how transaction processing systems, methods and/or computer program products according to some embodiments of the present invention may be integrated with other elements of a vehicle 620 and/or other devices. As shown in FIG. 6, a wireless transaction preprocessing user device may be integrated with components of vehicle electronic systems. For example, a transaction client 602 may interact with a vehicle controller 604 and/or a vehicle dashboard display 606. The transaction client 602 may include software that executes on the vehicle controller 604 and/or another processor in the vehicle. The transaction client 602 may enable preprocessing of a transaction wirelessly via a short-range ad-hoc wireless network transceiver 612 that is mounted, for example, on a windshield 614 of the vehicle 620. User identification and/or security parameters may be obtained by the transaction client 602 via a keychain dongle 622 using a wired and/or wireless interface. Alternatively, a smart card and/or RFID card in a user's purse or wallet may be used. Options for transactions may be provided on the display 606 and soft keys 624 may be used to select various options. Accordingly, identification/authentication of a user may be provided via the display 606, the dongle 622 and/or other conventional techniques, and transmitted to the point-of-transaction 630 via a short-range wireless connection 650.

Still continuing with the description of FIG. 6, the point-of-transaction 630 may include a transaction server 632 and an antenna 634 that interfaces with the windshield-mounted transceiver 612. A plurality of applications 636 may be provided along with keys 638 and/or other identification and/or authentication information. Moreover, advertising and/or other content may be provided to the vehicle 620 via an advertising server 640, which may be integrated with or separate from the point-of-transaction. The advertising server 640 may include a profile database 642 and may use a wireless connection 644 that may include a cellular and/or satellite wireless connection. The advertising or other content may be served separately from the transaction processing and/or may be at least partially integrated therewith. It will be understood by those having skill in the art that other architectures for the vehicle 620, the advertising server 640 and/or the point-of-transaction 630 may be provided that may integrate the functionality of one or more of the blocks shown and/or may separate the functionality of individual blocks.

Accordingly, some embodiments of the present invention can preprocess a transaction wirelessly in response to a wireless transaction preprocessing device being in a queue for a point-of-transaction. Preprocessing may include identification/authentication information and/or identification/authentication information may be provided when the preprocessed transaction is completed at a point-of-transaction. Identification/authorization may be provided using a keypad that is associated with a vehicle, a cell phone, a wireless transaction preprocessing user device and/or the point-of-transaction. For example, in some embodiments, when driving up to an ATM, only a PIN number need be input to verify the transaction, and funds may then be taken and/or deposited. Security may be increased because the time at an ATM with the window open can be reduced or minimized. Moreover, when a balance transfer, debit card preloading and/or other non-cash transaction is taking place, the entire ATM transaction may be performed without the need to roll down the window. In other embodiments, a user's smart card may be preloaded with a cash amount at the point-of-transaction, without the need to lower the window of the car. ATM-like screens may be transmitted to a car dashboard display while the vehicle is in the queue. Identification/authentication may also be provided while the vehicle is in the queue.

Accordingly, ATM transactions may be provided according to various embodiments of the present invention with various levels of use of the ATM itself. In some embodiments, preprocessing of the transaction may be performed and then the ATM keypad is used to enter a PIN and the ATM is used to obtain and/or deposit money and/or other instruments. In other embodiments, client software in a user's vehicle and/or in a user's wireless device may be used to actually enter PIN information when the user is at the ATM. In some embodiments, ATM screens may be downloaded to the vehicle and/or the user device. The ATM can then be used merely to deposit or receive cash and/or other instruments. In still other embodiments, an identification device in the vehicle or associated with the user may by used to automatically transfer identification/authentication information without the need for active user participation in the process. Finally, for some transactions where cash and/or other instruments need not be transferred, the transaction may be completed at the ATM without the need for the user to actually touch the ATM, as long as it can be confirmed that the user that is associated with a given transaction is actually at the ATM.

In non-ATM transactions, such as a drive-through laundry, a ticket that is given by the laundry may include a bar code, or the ticket may include a smart card and/or an RFID tag, which then may be used to transmit information to the point-of-transaction while the vehicle is in the queue. In other embodiments of the present invention, a queue itself may not be recognized, but, rather, general proximity to a point-of-transaction may be recognized whether or not the device/user is in a queue.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of performing a transaction comprising:
preprocessing the transaction wirelessly in response to a portable wireless transaction preprocessing user device being sensed in a physical queue of physical users for a point-of-transaction, wherein the preprocessing includes the portable wireless transaction preprocessing user device receiving and displaying a transaction processing user interface transmitted by the point-of-transaction.

2. A method according to claim 1 further comprising:
completing the transaction that was preprocessed, in response to the wireless transaction preprocessing user device that is in the physical queue of physical users reaching the point-of-transaction.

3. A method according to claim 2 wherein the transaction is an automatic teller machine (ATM) transaction, wherein preprocessing comprises transmitting and/or accepting indications of a type of ATM transaction and a monetary amount of the ATM transaction wirelessly from a wireless transaction preprocessing user device in a vehicle that is in a vehicle queue for the ATM, and wherein completing the transaction comprises accepting a personal identification number and dispensing and/or accepting funds at the ATM.

4. A method according to claim 2 wherein the transaction is a financial transaction, wherein preprocessing comprises transmitting and/or accepting information regarding the financial transaction wirelessly from a wireless transaction preprocessing user device that is in a physical queue of physical users for the point-of-transaction, and wherein completing the transaction comprises accepting additional information and completing the financial transaction at the point-of-transaction.

5. A method according to claim 2 wherein the transaction is a purchase of goods and/or services at a drive-up window, wherein preprocessing comprises transmitting and/or accepting identification of the goods and/or services wirelessly from a wireless transaction preprocessing user device in a vehicle that is in a vehicle queue for the drive-up window and wherein completing the transaction comprises accepting payment for the goods and/or services and providing the goods and/or services at the drive-up window.

6. A method according to claim 2 wherein the transaction is a purchase of goods and/or services at the point-of-transaction, wherein preprocessing comprises transmitting and/or accepting information regarding the transaction wirelessly from a wireless transaction preprocessing user device that is in a physical queue of physical users for the point-of-transaction and wherein completing the transaction comprises completion of a payment for the goods and/or services and providing the goods and/or services at the point-of-transaction.

7. A method according to claim 2 wherein preprocessing comprises preprocessing the transaction wirelessly in response to the wireless transaction preprocessing user device being second or more in the physical queue of physical users for the point-of-transaction and wherein completing the transaction comprises completing the transaction at the point-of-transaction in response to the wireless transaction preprocessing user device being first in the physical queue of physical users for the point-of-transaction.

8. A method according to claim 1 further comprising: transmitting/receiving advertising related to the point-of-transaction to/at the wireless transaction preprocessing user device that is in the physical queue of physical users for the point-of-transaction.

9. A method according to claim 1 wherein the wireless transaction preprocessing user device is a device that provides an identification of a user thereof.

10. A method according to claim 1 wherein the wireless transaction preprocessing user device is integrated into a multiple purpose wireless user device.

11. A method according to claim 10 wherein the multiple purpose wireless user device comprises a vehicle audio/video/navigation system.

12. A method according to claim 1 wherein preprocessing is performed wirelessly using a short-range ad-hoc wireless network.

13. A method according to claim 1, wherein the preprocessing includes providing a coupon to the user of the portable wireless transaction preprocessing user device.

14. A point-of-transaction system comprising:
a wireless system that is configured to preprocess a transaction wirelessly in response to a portable wireless transaction preprocessing user device being sensed in a physical queue of physical users for the point-of-transaction, wherein the preprocessing includes the portable wireless transaction preprocessing user device receiving and displaying a transaction processing user interface transmitted by the point-of-transaction; and a transaction completing system that is configured to complete the transaction that was preprocessed, in response to the wireless transaction preprocessing user device that is in the physical queue of physical users reaching the point-of-transaction.

15. A point-of-transaction system according to claim 14 wherein the transaction is a financial transaction, wherein the wireless system is configured to wirelessly accept information regarding the financial transaction from a wireless transaction preprocessing user device in a physical queue of physical users for the point-of-transaction system, and wherein the transaction completing system is configured to accept additional information needed to complete the financial transaction and to complete the financial transaction.

16. A point-of-transaction system according to claim 14 wherein the transaction is a purchase of goods and/or services, wherein the wireless system is configured to wirelessly accept information regarding the transaction from a wireless transaction preprocessing user device in a physical queue of physical users for the point-of-transaction system and wherein the transaction completing system is configured to complete the payment for the goods and/or services and to provide the goods and/or services at the point-of-transaction.

17. A computer program product comprising a computer-readable storage medium having computer-readable program code embodied in the medium, the computer-readable program code configured to provide the point-of-transaction system of claim 14.

18. A point-of-transaction system according to claim 14, wherein the preprocessing or the completion of the transaction includes providing a coupon to the user of the portable wireless transaction preprocessing user device.

19. A point-of-transaction system comprising:
a wireless system that is configured to preprocess a transaction wirelessly in response to a portable wireless transaction preprocessing user device being sensed in a physical queue of physical users for the point-of-transaction; and
a transaction completing system that is configured to complete the transaction that was preprocessed, in response to the wireless transaction preprocessing user device that is in the physical queue of physical users reaching the point-of-transaction;
wherein the preprocessing or the completion of the transaction includes providing a coupon to the user of the portable wireless transaction preprocessing user device.

* * * * *